(12) United States Patent  
Nakatsugawa

(10) Patent No.: US 8,089,930 B2  
(45) Date of Patent: Jan. 3, 2012

(54) WIRELESS COMMUNICATION CONTROL METHOD AND RADIO TERMINAL

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 12/236,216

(22) Filed: Sep. 23, 2008

(65) Prior Publication Data

US 2009/0207791 A1 Aug. 20, 2009

(30) Foreign Application Priority Data

Feb. 19, 2008 (JP) ................................ 2008-036839

(51) Int. Cl.  
*H04W 4/00* (2009.01)
(52) U.S. Cl. ..................... 370/329; 370/321; 370/395.4
(58) Field of Classification Search .................. 370/329, 370/328, 310, 252, 341, 346; 455/450, 451, 455/452.1, 452.2, 464, 509  
See application file for complete search history.

(56) References Cited

U.S. PATENT DOCUMENTS

| 2007/0104141 A1* | 5/2007 | Park et al. ..................... 370/329 |
| 2008/0232260 A1* | 9/2008 | Yeo et al. ...................... 370/242 |
| 2009/0061887 A1* | 3/2009 | Hart et al. ..................... 455/450 |
| 2009/0190537 A1* | 7/2009 | Hwang et al. ................. 370/329 |
| 2010/0265896 A1* | 10/2010 | Park et al. ..................... 370/329 |

OTHER PUBLICATIONS

IEEE Std802.16-2004, Air Interface for Fixed Broadband Wireless Access Systems, Oct. 1, 2004.  
IEEE Std802.16e-2005 (Amendment and Corrigendum to IEEE Std802.16-2004), Air Interface for Fixed Broadband Wireless Access Systems, Amendment 2: Physical and Medium Access Control Layers for Combined Fixed and Mobile Operation in Licensed Bands, Feb. 28, 2006.

* cited by examiner

*Primary Examiner* — Gary Mui  
(74) *Attorney, Agent, or Firm* — Myers Wolin, LLC

(57) ABSTRACT

A radio terminal, in a transmission opportunity of each of plural kinds of allocation request schemes for a first uplink radio resource, the transmission opportunity being periodically allocated from the base station, estimates timings that the first uplink radio resource is allocated from the base station when an allocation request of a corresponding allocation request scheme is transmitted, based on a cycle of the transmission opportunity and a turnaround time of the allocation request scheme, and transmits the allocation request to the base station in a transmission opportunity selected by the estimated timing.

19 Claims, 14 Drawing Sheets

WIRELESS COMMUNICATION CONTROL METHOD AND RADIO TERMINAL

CROSS-REFERENCE TO RELATED APPLICATION(S)

This application is based upon and claims the benefit of priority of the prior Japanese Application No. 2008-036839 filed on Feb. 19, 2008 in Japan, the entire contents of which are hereby incorporated by reference.

FIELD

The embodiment(s) discussed herein is directed to a wireless communication control method and a radio terminal. For example, the embodiment(s) may be used in a wireless communication system in which a base station allocates a radio resource (frequency, timing, etc.) used for wireless communications to a radio terminal.

BACKGROUND

Recently, the IEEE 802.16 standard has attracted public attention as one of wireless communication technologies. The IEEE 802.16 standard is a technology developed as one of schemes for defining a Wireless Metropolitan Area Network (MAN) which provides a wireless communication path between a communication service provider and a user site instead of a telephone line or an optical fiber line, and makes a Metropolitan Area Network (MAN), which is a broadband network for interconnecting, for example, Local Area Networks (LANs) in a city or a certain region, into a wireless network. The IEEE 802.16 standard specifies that one base station can cover, for example, an area of about 50 km radius at a transmission speed of maximum 70 megabits per second.

Currently, an IEEE 802.16d specification (IEEE 802.16-2004) for fixed communications and an IEEE 802.16e specification (IEEE 802.16e-2005) for mobile communications are standardized in the IEEE 802.16 Working Group.

A wireless communication system includes, for example, a base station (BS) and one or more radio terminals (MS: Mobile Station) as user equipment (UE), and transmits or receives a radio signal between a BS and a MS via a radio link. A radio link includes a downlink (DL) which is a direction from a BS to a MS and an uplink (UL) which is the opposite direction.

In the IEEE 802.16e, a radio frame based on an Orthogonal Frequency Division Multiple Access (OFDMA) scheme is used for transmission of a radio signal.

FIG. 14 illustrates an exemplary radio frame of the IEEE 802.16e. In FIG. 14, a transverse axis denotes a time direction indicated by a symbol unit, and a vertical axis denotes a frequency direction indicated by a logical sub-channel (unit grouping a plurality of sub-carriers).

In FIG. 14, a Time Division Duplex (TDD) scheme is used as a multiplexing method of an uplink (UL) and a downlink (DL), and a frame is time-divided into a DL sub-frame of a first half and an UL sub-frame of a second half. A DL sub-frame is a frame which is transmitted to a MS from a BS, and an UL sub-frame is a frame which is transmitted to a BS from a MS.

ADL sub-frame includes fields of a preamble, a Frame Control Header (FCH), a DL-MAP, an UL-MAP, and a DL burst.

A preamble is a known signal pattern (synchronizing signal) used for a MS to detect a BS and to synchronize with a radio frame transmitted by a BS.

A DL-MAP and an UL-MAP (hereinafter, referred as simply "MAP data") are signals containing allocation information (corresponding MS, modulation scheme used, error correction code, etc.) of a certain radio resource (burst) of a DL sub-frame and an UL sub-frame for a MS. In FIG. 14, six DL bursts of #1 through #6 are allocated to a DL sub-frame. Data (user data or control message) to be transmitted to a MS from a BS can be mapped to a DL burst, and in FIG. 14, an UL-MAP which is one of control messages is mapped to a DL burst #1.

A Frame Control Header (FCH) is a signal which defines information about a BS or information used for a MS to decode a burst (containing MAP data) of a DL sub-frame, and includes information such as a mapping area of a DL-MAP in a DL sub-frame, a coding scheme, the number of repetition times, etc.

Meanwhile, a plurality of UL bursts (five of #1 to #5 in FIG. 14) can be mapped to an UL sub-frame, and data (user data or control message) to be transmitted to a BS from a MS can be mapped to an UL burst. Also, a part of an UL burst can be allocated as a ranging area (ranging sub-channel) used, for example, when a MS attempts an initial access to a BS.

A MS detects a preamble signal of a DL sub-frame to establish synchronization with a radio frame transmitted from a BS, and demodulates and decodes MAP data (DL-MAP and UL-MAP) based on a FCH, thereby recognizing which burst (frequency and timing) in a radio frame can be used in communication with a BS and which modulation/demodulation scheme and error correction code can be used in the communication.

That is, in the IEEE 802.16e, both communications of a DL and an UL are performed according to MAP data generated by a BS. For this reason, in the IEEE 802.16e, an MS is allocated an UL burst for UL data transmission from a BS when a MS desires to transmit UL data. There are several scheduling types as a communication control method for this.

Various applications such as a web, a voice, a motion picture, etc. are executed in a MS. For example, a silence-compressed voice communication application in which a real-time characteristic of data is high and variable-rate traffic is generated is taken as an example.

In a case of such an application, traffic includes a voiced section in which UL data is generated and a silence section in which UL data is not generated, which depend on whether a voice exists or not. In a voiced section, a MS transmits UL data at a certain communication rate according to a voice coding scheme. Therefore, a BS is required to allocate an UL burst to a MS.

Meanwhile, in a silence section, a BS is not required to allocate an UL burst to a MS, and it can use the unused radio resource in a communication with any other MS, so that since use efficiency of a radio resource is increased, the UL data throughput in the whole BS can be increased.

Therefore, in order to efficiently use a radio resource, it is preferred that a BS dynamically or rapidly recognizes an allocation of an UL burst for a MS according to whether UL data from a MS exist or not and then this is reflected in scheduling. As a communication control method suitable for an UL connection with such a traffic characteristic, a scheduling type so called an extended real time polling service (ertPS) is specified in the IEEE 802.16e.

In the ertPS, based on a maximum transmission rate (Max sustained rate) which is one of traffic parameters set when an UL connection is established, a BS can periodically allocate an UL burst to a MS for transmission of UL data without an allocation request from a MS. Also, a BS can perform polling for MSs in consideration of the fact that there is a case where a MS requests to change an allocation size of an UL burst (an allocation is suspended when an allocation size is changed to zero (0)).

Here, in the case of the IEEE 802.16e, "polling" means that a BS periodically allocates an UL burst small enough for a MS to transmit a Bandwidth Request (BR) message (e.g., 6 bytes) which is an allocation request message of an UL burst. In the IEEE 802.16e, when the ertPS is used, a polling cycle is arbitrary. There also exists a BS which does not perform such polling.

When UL data is not generated from an application as in a silence section, a MS requests a BS to suspend an allocation of an UL burst, thereby suspending an allocation of an UL burst from a BS. Thereafter, when UL data is generated in a MS, a MS requests a BS to allocate an UL burst suitable for an UL data size again. As described above, a MS repetitively requests a BS to suspend/resume an allocation of an UL burst depending on whether UL data exist or not.

[Non-Patent Document 1] IEEE 802.16 (TM)-2004
[Non-Patent Document 2] IEEE 802.16e (TM)-2005

In the above-mentioned art, it is not actively discussed which transmission opportunity a MS has to use to perform an allocation request in a case where transmission opportunities of plural kinds are allocated from a BS for an allocation request of an UL burst of a MS. Therefore, according to timings that a MS performs an allocation resumption request of an UL burst, a delay may occur until an UL burst is actually allocated from a BS, thereby deteriorating communication quality of an uplink.

SUMMARY

For example, a method and/or a radio terminal described below is used.

(1) A wireless communication control method in a wireless communication system including a radio terminal and a base station for allocating an uplink radio resource to the radio terminal may be used, which includes: at the radio terminal, in a transmission opportunity of each of plural kinds of allocation request schemes for a first uplink radio resource, the transmission opportunity being periodically allocated from the base station, estimating timings that the first uplink radio resource is allocated from the base station when an allocation request of a corresponding allocation request scheme is transmitted, based on a cycle of the transmission opportunity and a turnaround time of the allocation request scheme; selecting an allocation request scheme corresponding to a timing satisfying a predetermined selection criterion among the estimated timings; and transmitting the allocation request to the base station by a selected allocation request scheme in a transmission opportunity corresponding to the selected allocation requests scheme.

(2) Here, the timing satisfying the selection criterion may be the earliest timing among the estimated timings.

(3) Also, the transmission opportunity may include at least two among a first transmission opportunity, corresponding to a first allocation request scheme, which is periodically allocated a second uplink radio resource for the allocation request from the base station without a request to the base station, a second transmission opportunity, corresponding to a second allocation request scheme, which is allocated a third uplink radio resource for requesting the base station to allocate a second uplink radio resource used for the allocation request from the base station, and a third transmission opportunity, corresponding to a third allocation request scheme, which is allocated a fourth uplink radio resource for reporting information about reception quality to the base station.

(4) The radio terminal may obtain the turnaround time for each of the allocation request schemes by measuring a time until the first uplink radio resource is allocated after the allocation request is made by each of the allocation request schemes in the past.

(5) The radio terminal may obtain the turnaround time for the first allocation request scheme by measuring a time until the first uplink radio resource is allocated after the allocation request is made by the first allocation request schemes in the past.

(6) The radio terminal may obtain the turnaround time for the second allocation request scheme by measuring a time until the first uplink radio resource is allocated from the base station in response to a corresponding allocation request after allocation of the second uplink radio resource is requested to the base station by using the third uplink radio resource by the second allocation request scheme in the past, and the allocation request is then made by using the second uplink radio resource allocated by the base station.

(7) The radio terminal may obtain the turnaround time for the third allocation request scheme by measuring a time until the first uplink radio resource is allocated after the allocation request is made by using the fourth uplink radio resource by the third allocation request schemes in the past.

(8) The radio terminal may select an allocation request scheme in which the amount of a message transmitted to or received from the base station is small when there is a plurality of allocation request schemes corresponding to a timing satisfying the selection criterion.

(9) The radio terminal may detect a change of the cycle of each of the allocation request schemes based on a plurality of past transmission opportunity allocation intervals and compensate the estimated timing based on the detected change.

(10) A radio terminal in a wireless communication system which includes the radio terminal and a base station for allocating an uplink radio resource to the radio terminal may be used, which includes: an estimating unit that estimates, in a transmission opportunity of each of plural kinds of allocation request schemes for a first uplink radio resource, the transmission opportunity being periodically allocated from the base station, timings that the first uplink radio resource is allocated from the base station when an allocation request of a corresponding allocation request scheme is transmitted, based on a cycle of the transmission opportunity and a turnaround time of the allocation request scheme; and an allocation request transmission unit that transmits the allocation request to the base station in a transmission opportunity selected by the estimated timing.

(11) Here, a transmission opportunity selected by the estimated timing may be a transmission opportunity of an allocation request scheme corresponding to the earliest timing among the estimated timings.

(12) The estimating unit may include a detecting unit which detects whether or not the transmission opportunity includes two or more of a first transmission opportunity, corresponding to a first allocation request scheme, which is periodically allocated a second uplink radio resource for the allocation request from the base station without a request to the base station, a second transmission opportunity, corresponding to a second allocation request scheme, which is allocated a third uplink radio resource for requesting the base station to allocate a second uplink radio resource used for the allocation request from the base station, and a third transmission opportunity, corresponding to a third allocation request scheme, which is allocated a fourth uplink radio resource for reporting information about reception quality to the base station.

(13) The estimating unit may obtain the turnaround time of each of the allocation request scheme by measuring a time until the first uplink radio resource is allocated after the allocation request is made by each of the allocation request schemes in the past.

(14) The estimating unit may include a first turnaround measuring unit which obtains the turnaround time for the first allocation request scheme by measuring a time until the first uplink radio resource is allocated after the allocation request is made by using the second uplink radio resource by the first allocation request schemes in the past.

(15) The estimating unit may include a second turnaround time measuring unit which obtains the turnaround time for the second allocation request scheme a time until the first uplink radio resource is allocated from the base station in response to a corresponding allocation request after allocation of the second uplink radio resource is requested to the base station by using the third uplink radio resource by the second allocation request scheme in the past, and the allocation request is then made by using the second uplink radio resource allocated by the base station.

(16) The estimating unit may include a third turnaround time measuring unit which obtains the turnaround time for the third allocation request scheme by measuring a time until the first uplink radio resource is allocated after the allocation request is made by using the fourth uplink radio resource by the third allocation request schemes in the past.

(17) The allocation request transmission unit may select an allocation request scheme in which the amount of a message transmitted to or received from the base station is small when there is a plurality of allocation request schemes corresponding to a timing satisfying the selection criterion.

(18) The estimating unit may include a periodicity detecting unit which detects a change of the cycle of each of the allocation request schemes based on a plurality of past transmission opportunity allocation intervals and a timing compensating unit which compensates the estimated timing based on the detected change.

(19) A wireless communication control method in a wireless communication system including a radio terminal and a base station for allocating an uplink radio resource to the radio terminal may be used, which includes: when a transmission opportunity of a first allocation request scheme comes before a transmission opportunity of a second allocation request scheme, if an estimated timing at which a radio resource is allocated by using the transmission opportunity of the first allocation request scheme is after an estimated timing at which a radio resource is allocated by using the transmission opportunity of the second allocation request scheme, the radio terminal transmitting an allocation request in the transmission opportunity of the second allocation request scheme to the base station without transmitting an allocation request in the transmission opportunity of the first allocation request shceme.

Additional objects and advantages of the embodiment(S) will be set forth in part in the description which follows, and in part will be obvious from the description, or may be learned by practice of the invention. The object and advantages of the embodiment(s) will be realized and attained by means of the elements and combinations particularly pointed out in the appended claims.

It is to be understood that both the foregoing general description and the following detailed description are exemplary and explanatory and are not restrictive of the embodiment (s), as claimed.

DESCRIPTION OF EMBODIMENT(S)

Hereinafter, an embodiment(s) will be described with reference to the drawings. The embodiment(s) is merely exemplary and is in no way intended to exclude various modifications and an application of a technology which are not described below. That is, the embodiment(s) can be variously modified within the scope of the proposed method and/or apparatus without departing from the concept thereof.

[A] Overview

First, an UL communication control method of a wireless communication system is briefly described with reference to FIGS. 1 to 4. The wireless communication system includes at least one BS and at least one MS which is user equipment (UE). The MS establishes a radio link with the BS to perform a wireless communication. As one example of the wireless communication scheme, an OFDMA (or OFDM) scheme conforming to the IEEE 802.16e is considered.

Figure 14:
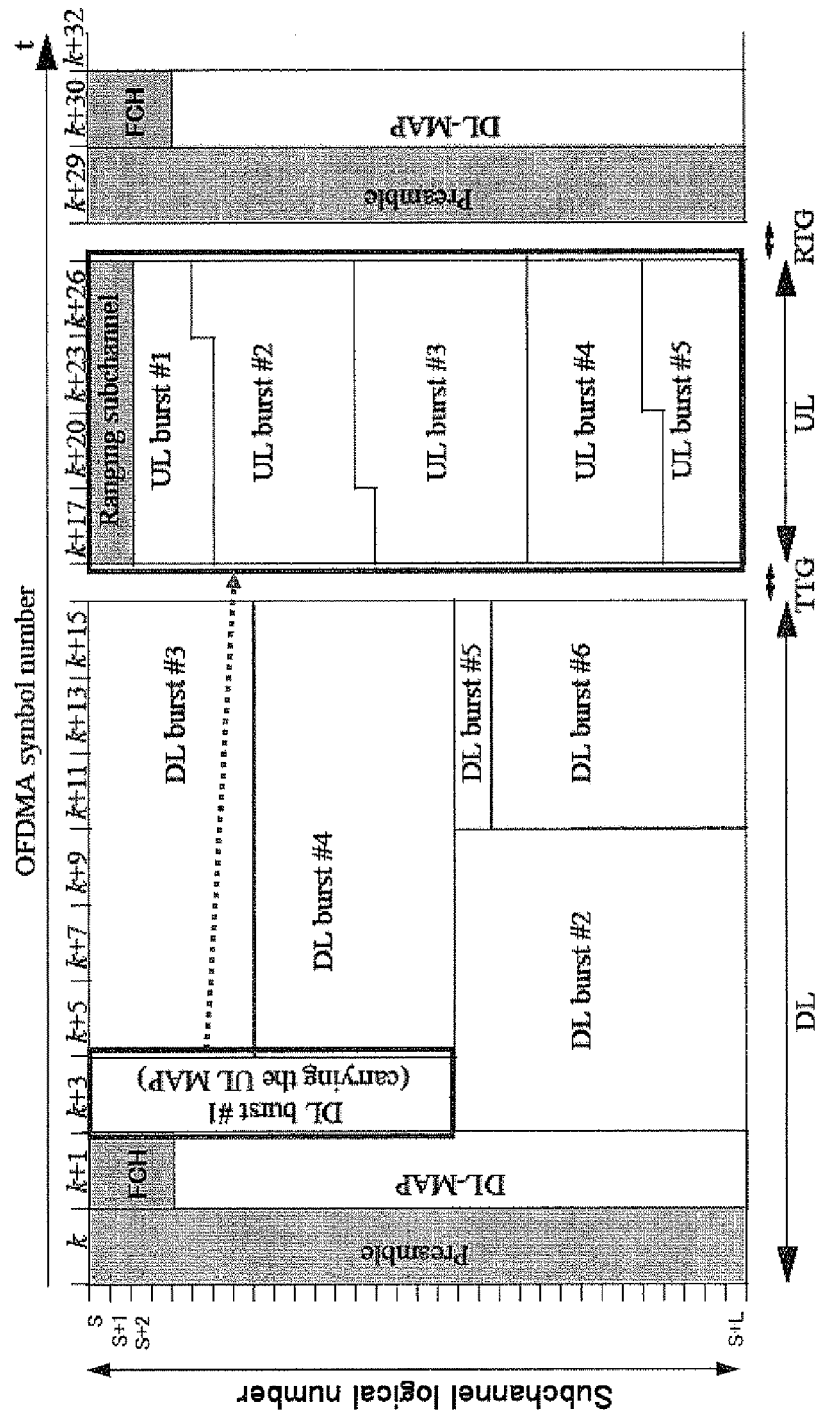
FIG. 14 is a view illustrating an exemplary radio frame of the IEEE 802.16e.

That is, a wireless communication between the BS and the MS can be performed by using a radio frame format depicted in FIG. 14. The BS can respectively designate (allocate) a DL burst (frequency, timing) as one example of a downlink radio resource which the MS uses to receive data and an UL burst (frequency, timing) as one example of an uplink radio resource which the MS uses to transmit data by using MAP data (UL/DL-MAP) which is an example of a control signal.

As described above, the MS can execute various applications such as a web, a voice, a motion picture, etc. and, even in the embodiment, can perform a communication by a voice communication application in which a real time characteristic of data is high and variable-rate traffic (voiced section and silence section) can be generated.

In such a wireless communication system, for example, three methods (first to third allocation request schemes) described below can be considered as schemes (sequence)

that the MS requests the BS to allocate (resume) an UL burst after an allocation of an UL burst (first radio resource) from the BS is suspended (or, after an UL burst is first allocated) upon generation of a silence section. A UL burst is used by the MS to transmit UL user data. Any other allocation request scheme may be added and be selected.

(1) Polling (First Allocation Request Scheme)

Even during an allocation of an UL burst from the BS is suspended, when the BS performs periodical polling for the MS, that is, when the BS periodically allocates an UL burst (second radio resource), which is one example of a first transmission opportunity, enough to transmit a BR message (e.g., 6 bytes) which is an allocation request message of an UL burst, the MS transmits the BR message as a response to polling to the BS by using the UL burst to thereby request the BS to restore an UL burst allocation size to an original size. When an UL burst is allocated to the MS from the BS in response to the request, the MS resumes transmission of UL data by using the UL burst [e.g., see an allocation request sequence (processes 701 to 704) of FIG. 2].

(2) Contention (Second Allocation Request Scheme)

When an UL burst [contention area (third radio resource)] for a CDMABR which is one example of a second transmission opportunity is set on an UL sub-frame [e.g., set to UIUC (Uplink Interval Usage Code)=12 by an UL-MAP], a CDMABR code is transmitted to the BS through the contention area to request an allocation of an UL burst (second radio resource) for transmission of the BR message. When an UL burst is allocated by a CDMA Allocation IE from the BS as a response to the CDMABR code, the MS transmits the BR message to the BS by using the UL burst to thereby request the BS to restore an allocation size of an UL burst to an original size. When an UL burst is allocated to the MS from the BS in response to the request, the MS resumes transmission of UL data by using the UL burst [e.g., see an allocation request sequence (processes 801 to 806) of FIG. 3].

(3) CQICH (Third Allocation Request Scheme)

When a Channel Quality Indicator (CQI) channel (CQICH) which is a control channel for periodically reporting a downlink Carrier to Interference and Noise Ratio (DL CINR) as an indicator of downlink (DL) radio channel quality to the BS is established between the BS and the MS [e.g., an UL burst (fourth radio resource) of UIUC=0 is allocated as one example of a third transmission opportunity by an DL-MAP], the MS transmits a codeword representing an allocation (resumption) request of an UL burst to the BS instead of the DL CINR (or together with the DL CINR) to thereby request the BS to restore an allocation size of an UL burst to an original size. When the BS allocates an UL burst to the MS in response to the request, the MS begins transmission of UL data by using the UL burst [e.g., see an allocation request sequence (processes 901 to 904) of FIG. 4].

Here, the MS detects and knows periodicity and timing when any one of UL bursts of (1) polling, (2) contention (region), and (3) CQI channel which are candidates of the UL burst allocation request schemes (sequences) has been already set up or is set up by the BS. When the periodicity and timing are already known, the MS can store them for latter use or can know them by receiving and analyzing an UL-MPA broadcasted to each frame from the BS in the case of the IEEE 802.16e. The three kinds of timings (transmission opportunities) for transmitting a message for requesting an UL burst are called allocation request opportunities.

For the candidate of the allocation request scheme which exists, the MS estimates a time (turnaround time) taken until an UL burst is actually allocated from the BS and a transmission of UL data becomes possible from after the request is executed. For the turnaround time, a default value of each of the allocation request schemes can be set in the MS in advance or either a value obtained by counting the number of frames until an allocation of an UL burst from an allocation request in an allocation request scheme executed in the past or an average value thereof can be used.

For example, since the number of frames until the BS allocates an UL burst from after the BS receives the BR message transmitted from the MS depends on an installation or performance of the BS, a first turnaround time can be estimated by a default value, and the next and subsequent turnaround times can be estimated based on the number of frames measured whenever the BR message is transmitted.

The MS estimates a frame (timing) of each of the allocation request scheme by which an UL burst finally used to transmit UL data after UL data is generated is allocated from the BS based on periodicity, an allocation request executable timing and a turnaround time of each of the allocation request schemes, and selects the allocation request scheme estimated as performing an allocation of an UL burst earlier than others and executes allocation request by using the selected allocation request scheme.

Figure 1:
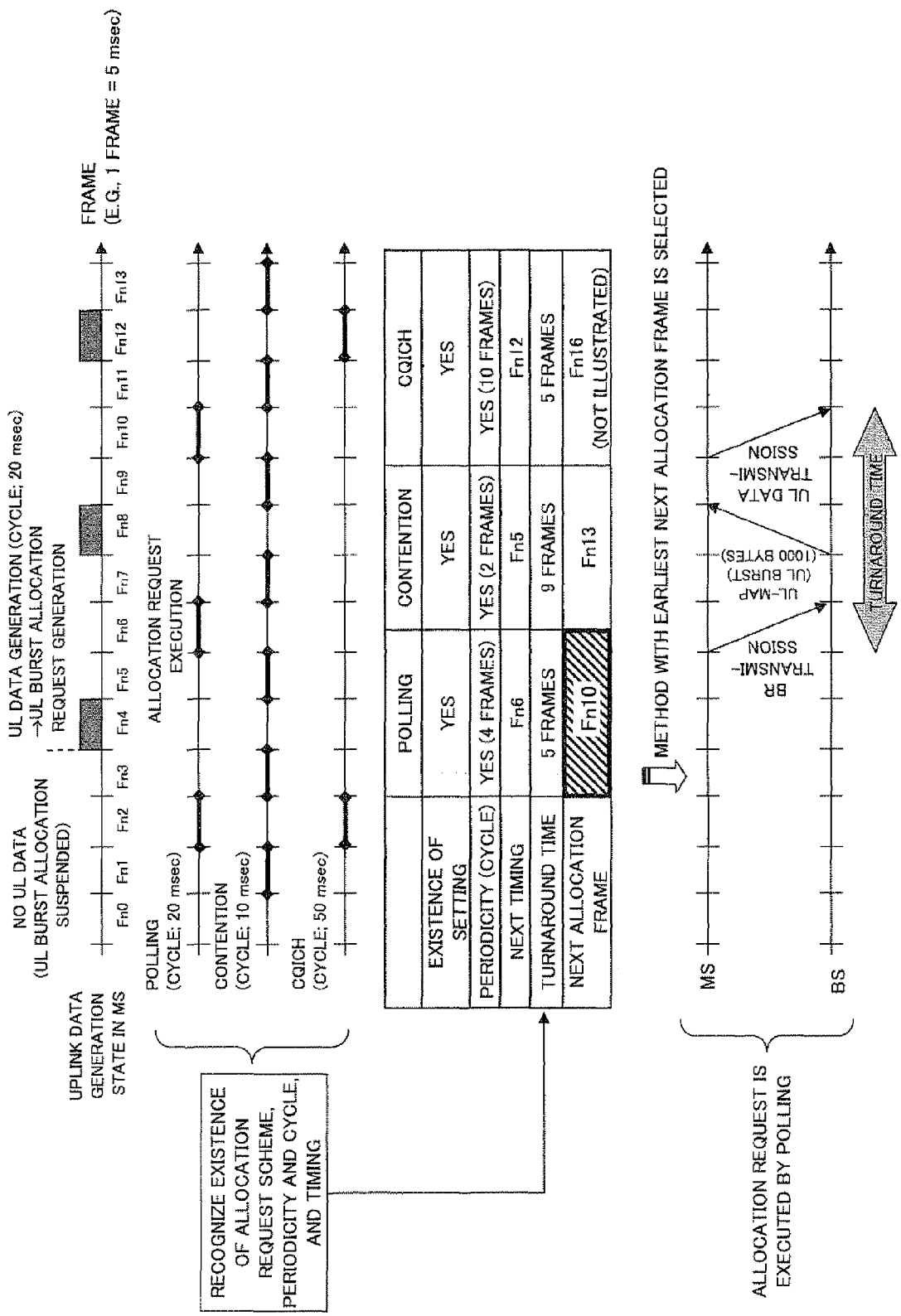
FIG. 1 is a schematic view illustrating an outline of an embodiment.

One example is illustrated in FIG. 1. In FIG. 1, a transverse axis denotes a time direction which uses a radio frame as a unit, and fourteen (14) frames of a frame Fn0 to a frame Fn13 are sequentially indicated under the assumption that one frame (in both a DL and an UL) is 5 ms (milliseconds).

Also, it is assumed that the BS is setting up polling of a 20 ms (i.e., 4 frames) cycle, contention of a 10 ms (i.e., 2 frames) cycle, and CQI channel of a 50 ms (i.e., 10 frames) cycle, respectively. In such a set-up environment, the MS does not generate UL data and suspends an allocation of an UL burst by the BS during the frames Fn0 to Fn3 among the thirteen frames of the frames Fn0 to Fn13, and generates the UL data during each of the frames Fn4, Fn8 and Fn12.

In this instance, the MS analyzes a received UL-MAP and discriminates which one of (1) polling, (2) contention, and (3) CQI channel which are candidates of the three allocation request schemes is set up by the BS and detects periodicity and timing of each of them if set up. In FIG. 1, the MS detects that a cycle of polling is four frames and the next timing is a frame Fn6, a cycle of contention is two frames and the next timing is a frame Fn5, and a cycle of CQI channel is ten frames and the next timing is a frame Fn12, respectively.

The MS estimates the turnaround time when each of the allocation request schemes (sequences) is executed, and estimates a frame (next allocation frame) to which an UL burst is to be allocated based on the estimating result. In FIG. 1, a frame Fn10 for polling, a frame Fn13 for contention, and a frame Fn16 (not illustrated in FIG. 1) for CQI channel are respectively estimated as next (UL burst) allocation frames.

Based on the estimating result, the MS selects the allocation request scheme with the earliest next allocation frame and requests an allocation (resumption) of an UL burst by the selected method. In FIG. 1, the MS selects polling in which the next allocation frame is a frame Fn10, and transmits the BR message to the BS by a timing (BR message transmission opportunity of a frame Fn6) of the next polling cycle to request a change of an allocation size of an UL burst (in FIG. 1, a change to 1,000 bytes from 0 byte).

According to the wireless communication control method described above, it is possible to efficiently use an uplink (UL) radio resource by dynamically allocating an UL burst to the MS from the BS depending on whether UL data from the MS exist or not, and it is also possible to reduce a time until an UL burst is allocated in order to resume an allocation of an UL burst from after the BS suspends an allocation of an UL burst for the MS.

Therefore, it is possible to reduce generation of data loss resulting from a delay time of UL data or buffer overflow, and it is possible to prevent the quality of an application in which a real time characteristic of, for example, a voice call is high from being deteriorated.

The selection criterion described above is a selection criterion which is set focusing on restricting a transmission delay of data to be transmitted to the BS from the MS, but it is also possible to set it focusing on that transmission processing of the MS is performed at a desired timing.

For example, in a case where an allocation request is performed in the first transmission opportunity among transmission opportunities, if a processing load is estimated as increased by other processing at timings that an allocation is performed, timings that an allocation is performed can be carried over to other timing by using other transmission opportunity (in FIG. 1, for example, an allocation request is performed by using CQI channel).

The MS can set other criterion for selecting a preferred timing among estimated timings as well as the processing load, and can perform an allocation request by using the allocation method and the transmission opportunity which correspond to a timing selected by the criterion.

The selection criterion may be stored in a memory of the MS to be read out if needed or may be notified to each MS or all the MSs within a radio area by the BS.

Preferably, in the transmission opportunities which are not selected, an allocation request is not transmitted. This is because power consumption occurred when a plurality of wireless communications are used in performing the same request can be avoided. Of course, if the BS has received a plurality of allocation requests and has allocated an UL burst for data transmission to the MS, it is possible to control not to allocate an UL burst according to other allocation requests.

The above-described method for setting the selection criterion can be applied to the following embodiment.

[B] Embodiment

Figure 5:
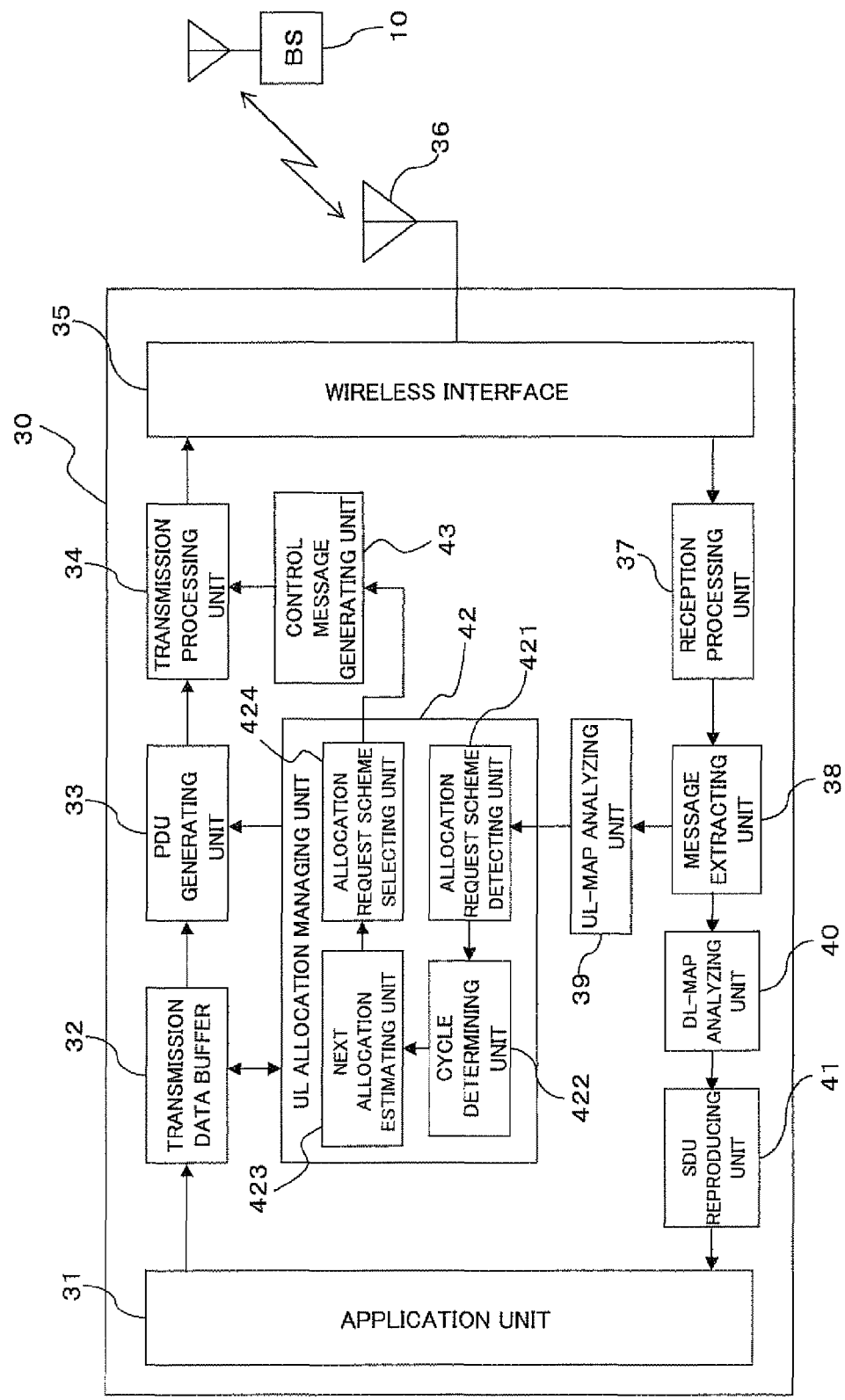
FIG. 5 is a block diagram illustrating a radio terminal (MS) according to the embodiment invention.

A function of the MS for realizing the wireless communication control method described above is exemplified below with reference to FIG. 5. FIG. 5 is a block diagram illustrating a configuration of the MS according to the embodiment of the present invention. The MS 30 of FIG. 5 includes an application unit 31, a transmission data buffer 32, a Protocol Data Unit (PDU) generating unit 33, a transmission processing unit 34, a wireless interface 35, an antenna 36, a reception processing unit 37, a message extracting unit 38, an UL-MAP analyzing unit 39, a DL-MAP analyzing unit 40, a Service Data Unit (SDU) reproducing unit 41, an UL allocation managing unit 42, and a control message generating unit 43.

The wireless interface 35 has the antenna 36 and transmits/receives a radio signal to/from external communication equipment such as the BS 10 through the antenna 36. For example, the wireless interface 35 converts a radio frame generated in the transmission processing unit 34 into a radio signal, amplifies the radio signal to a predetermined transmission power and transmits it to the BS 10 through the antenna 36, and it also transfers a radio signal received by the antenna 36 to the reception processing unit 37.

The application unit 31 has a function for processing data (user data) according to an application which a user uses in the MS 30. For example, the application unit 31 has a function for generating user data to be transmitted and transmitting it to the transmission data buffer 32 or a function for performing display processing, voice output processing, etc. according to user data received from the BS 10.

The transmission data buffer 32 temporarily maintains data generated by the application unit 31 in a predetermined processing unit, for example, a Service Data Unit (SDU).

When an UL burst is allocated in an UL sub-frame based on an UL-MAP received from the BS, under the control of the UL allocation managing unit 42, the PDU generating unit 33 reads out the SDU maintained in the transmission data buffer 32, confers a MAC header or a CRC, and performs SDU/PDU conversion processing such as fragmentation and packing, thereby generating a PDU.

The transmission processing unit 34 encodes and modulates a PDU generated in the PDU generating unit 33 and a control message (allocation request message of an UL burst) generated in the control message generating unit 43 and generates a radio frame. As an encoding scheme, forward error correction (FEC) coding such as, for example, a convolutional coding, a turbo coding, and a low density parity check (LDPC) coding may be used, and as the modulating scheme, quadrature phase shift keying (QPSK) or multi-level quadrature amplitude modulation (QAM) such as 16 QAM or 640 QAM may be used. The coding and modulation can be adaptively controlled [Adaptive modulation and coding (AMC) control] according to the quality of a radio channel between the MS and the BS.

Meanwhile, the reception processing unit 37 detects (extracts), demodulates, and decodes a radio frame from a radio signal of a downlink received from the BS 10 through the wireless interface 35. As a demodulating scheme, a demodulating scheme corresponding to the modulating scheme (QPSK, 16 QAM, 64 QAM, etc.) used in the BS which is a transmitting site of the received radio signal can be used. Also, as a decoding scheme, a decoding scheme corresponding to the coding scheme (error correction coding such as convolutional coding, turbo coding, LDPC coding, etc.) used in the transmitting site can be used.

The message extracting unit 38 extracts (detects) MAP data (DL/UL-MAP) from demodulated data of the radio frame obtained in the reception processing unit 37, and transmits the UL-MAP to the UL-MAP analyzing unit 39 and the DL-MAP to the DL-MAP analyzing unit 40, respectively.

The UL-MAP analyzing unit 39 analyzes the content of the UL-MAP transmitted from the message extracting unit 38 and transmits the information to the UL allocation managing unit 42.

The DL-MAP analyzing unit 40 analyzes the content of the DL-MAP transmitted from the message extracting unit 38, and, when the user data (PDU) is mapped to a DL burst allocated to the MS 30, extracts the PDU from the DL burst and transmits the PDU to the SDU reproducing unit 41.

The SDU reproducing unit 41 performs the PDU/SDU conversion processing such as defragmentation, depacking, removal of a MAC header or CRC, etc. for the PDU transmitted from the DL-MAP analyzing unit 40 to reproduce the SDU and transfers it to the application unit 31.

The UL allocation managing unit 42 checks whether transmission standby UL data (SDU) exist in the transmission data buffer 32 or not, and instructs the PDU generating unit 33 to generate the PDU when an UL burst is allocated by the UL-MAP. When an UL burst is not allocated, the UL allocation managing unit 42 requests the control message generating unit 43 to generate an allocation request message (control message) of an UL burst such as the BR message, a CDMABR code, and a codeword transmitted by using CQICH.

The control message generating unit 43 receives the request from the UL allocation managing unit 42 and generates a control message according to the request, and transmits the control message to the transmission processing unit 34 to thereby request the transmission processing unit 34 to transmit the control message to the BS 10.

The UL allocation managing unit 42 comprises, for example, an allocation request scheme detecting unit 421, a cycle determining unit 422, a next allocation estimating unit 423, and an allocation request scheme selecting unit 424 in order to realize the above-mentioned uplink (UL) communication control method explained with reference to FIGS. 1 to 4.

Here, the allocation request scheme detecting unit 421 detects whether plural kinds of the candidates (periodical transmission opportunity corresponding to each allocation request scheme) of the UL burst allocation request schemes are set, for example, two ore more kinds among polling, connection area, and CQI channel are set or not based on information of the UL-MAP analyzed in the UP-MAP analyzing unit 39.

The cycle determining unit 422 checks a setting cycle of each of candidates detected by the allocation request scheme detecting unit 421. For example, the cycle determining unit 422 checks an elapsed time (e.g., the number of elapsed frames) of from a past (previous) transmission opportunity until the next transmission opportunity and determines the setting cycle. When the setting cycle is not constant but fluctuates, an average or dispersion of the cycles can be computed.

The next allocation estimating unit 423, as illustrated in FIG. 1, estimates timings (e.g., frame number) that an UL burst is allocated from the BS 10 so that UL data can be transmitted, based on a frame number detected by the allocation request scheme detecting unit 421, a cycle determined by the cycle determining unit 422, and a turnaround time (e.g., the number of frames) of a request sequence of each allocation request when an allocation request to the BS 10 is performed in the next allocation request opportunity in each of the allocation request schemes.

As the turnaround time, a default time (frame time) of each of the allocation request schemes may be used, or the turnaround time may be obtained from a past result, that is, by measuring a time until an UL burst is allocated in the allocation request scheme executed in the past. The latter case can improve precision of a corresponding timing estimation, compared to a case using a default time, since a timing estimation based on a turnaround time based on the whole actual radio environment becomes possible.

For example, in a case of polling (see FIG. 2), the number of elapsed frames until an UL burst is allocated is measured after the BR message is transmitted to the BS 10 in response to polling in the past. In the case of contention (see FIG. 3), a CDMABR code is transmitted to the BS 10 through contention area, an UL burst is then allocated by a CDMA allocation IE, the BR message is transmitted to the BS by using the UL burst, and the number of elapsed frames until an UL burst is allocated for the request is measured. In the case of CQICH (see FIG. 4), a codeword is transmitted to the BS 10 through CQICH, and the number of elapsed frames until an UL burst is allocated is measured.

That is, the next allocation estimating unit 423 is used as one example of a first turnaround time measuring unit for measuring and obtaining the turnaround time for polling (first allocation request scheme), and also used as one example of a second turnaround time measuring unit for measuring and obtaining the turnaround time for contention (second allocation request scheme). Furthermore, the next allocation estimating unit 423 is also used as one example of a third turnaround time measuring unit for measuring and obtaining the turnaround time for CQICH (third allocation request scheme).

The allocation request scheme selecting unit 424 selects an allocation request scheme in which a frame number estimated in the next allocation estimating unit 423 is smallest, and requests the control message generating unit 43 to generate and transmit an allocation request message through the next allocation request opportunity of the allocation request scheme. The corresponding selecting unit 424 can maintain and manage information such as the frame number, a cycle, an elapsed time, an estimated timing, etc. in a memory which is not illustrated in the drawings, for example, as data of a table type illustrated in FIGS. 1, 11, and 12.

(Operation of MS)

Hereinafter, operations of the MS 30 for detecting an allocation request scheme, checking a periodicity, and measuring (estimating) a turnaround time of a request sequence are described with reference to flowcharts of FIGS. 6 to 8.

Figure 6:
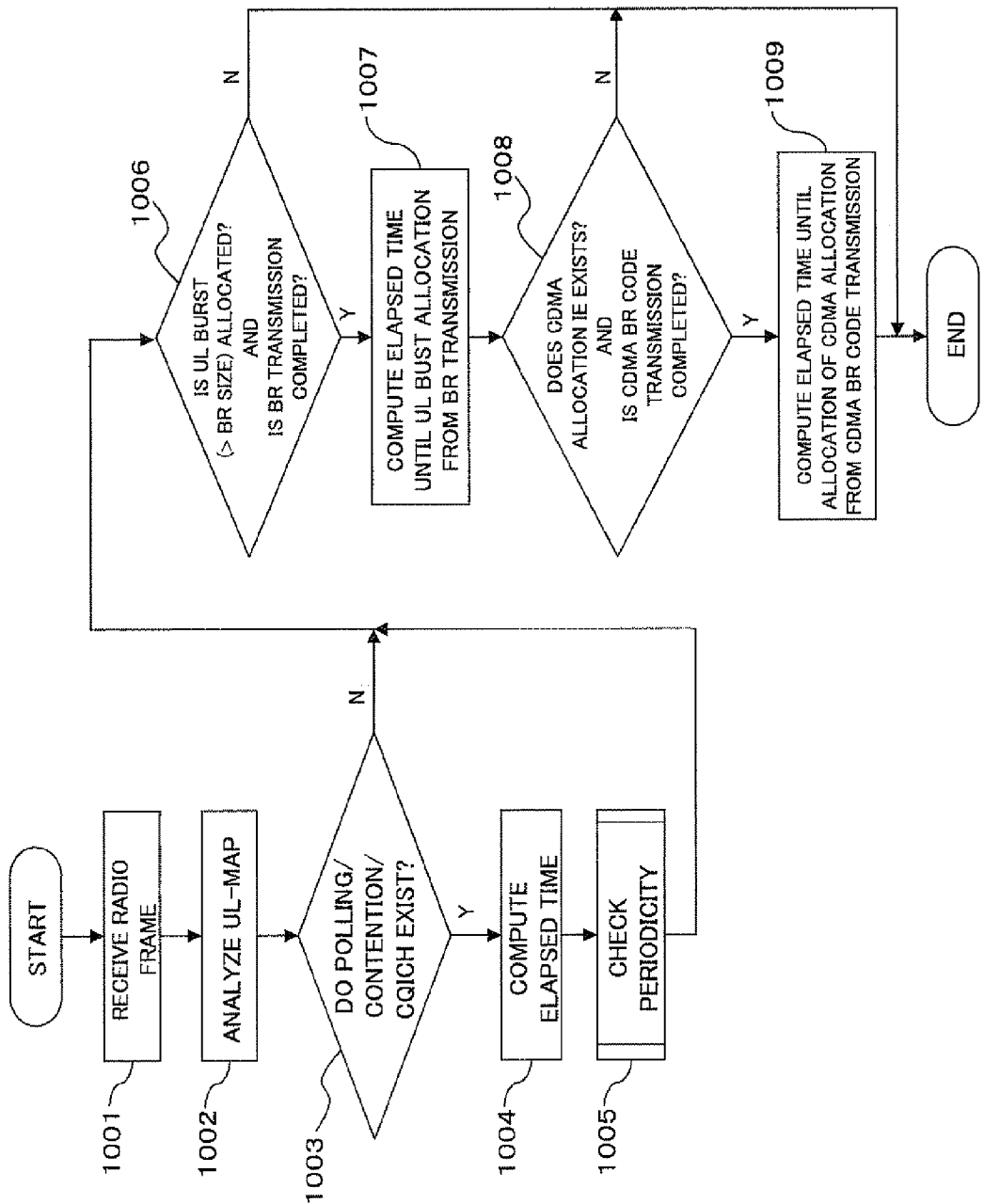
FIG. 6 is a flowchart illustrating an exemplary operation (detecting an allocation request scheme, checking a periodicity and measuring a turnaround time) of the MS depicted in FIG. 5.

As illustrated in FIG. 6, the MS 30 receives a radio frame from the BS 10 through the wireless interface 35, and the reception processing unit 37 performs a reception processing described above (process 1001).

The reception-processed signal is transmitted to the message extracting unit 38, an UL-MAP is extracted in the message extracting unit 38, and the content thereof is analyzed in the UL-MAP analyzing unit 39 (process 1002).

The analysis result is transmitted to the allocation request scheme detecting unit 421 of the UL allocation managing unit 42, and the allocation request scheme detecting unit 421 detects whether polling (e.g., UL burst of the size enough to transmit the BR message), contention area (e.g., UR burst that is set to UIUC=12 and the ranging method is set to Ob10 or Ob11 in hexadecimal notation), and CQI channel (e.g., UL burst which is set to UIUC=0) are present (are set) or not, based on the analysis result of the UL-MAP (process 1003).

As a result, if a plurality of candidates of allocation request schemes are detected, for each of the detected allocation request schemes, an elapsed time (the number of frames) from the previous time allocation request opportunity is computed by the cycle determining unit 422 (process 1004 from Y route of process 1003).

The cycle determining unit 422 compares the computed elapsed time to the previously computed elapsed time to check a periodicity of the allocation request opportunity (process 1005). As one example of the checking method, a method illustrated in FIG. 7 or a method illustrated in FIG. 8 can be considered.

Figure 7:
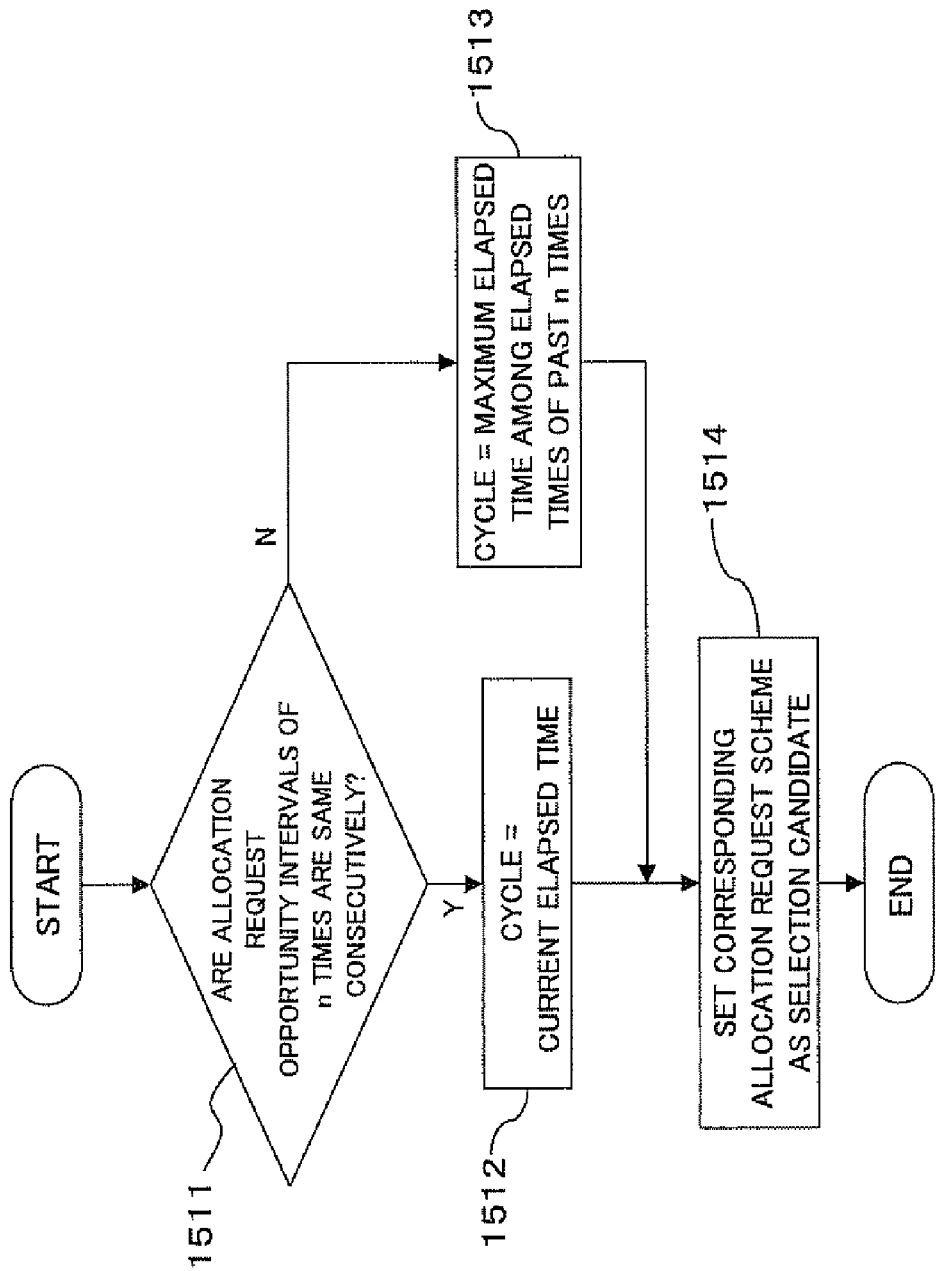
FIG. 7 is a flowchart illustrating one example of a periodicity checking process depicted in FIG. 6.

In a case of the example illustrated in FIG. 7, the cycle determining unit 422 measures and stores an interval (elapsed time) of the allocation request opportunities of past n times (n is a natural number). An n value is a fixed value, and it can be set in the MS 30 in advance (e.g., n=3) and can be adaptively varied.

The cycle determining unit 422 checks whether all of n times are same in interval or not (processes 1511), and regards the interval (current elapsed time) as the detecting cycle of the allocation request opportunity of a corresponding allocation request scheme if same (process 1512 from Y route of process 1511), and regards the maximum interval among intervals of n times as the detecting cycle if not same (process 1513 from N route of process 1511), and extracts (sets) the allocation request scheme of the cycle as the selection candidate (process 1514). In the preferred embodiment of the present invention, there is no case where a corresponding allocation request scheme is not selected as a candidate.

Figure 8:
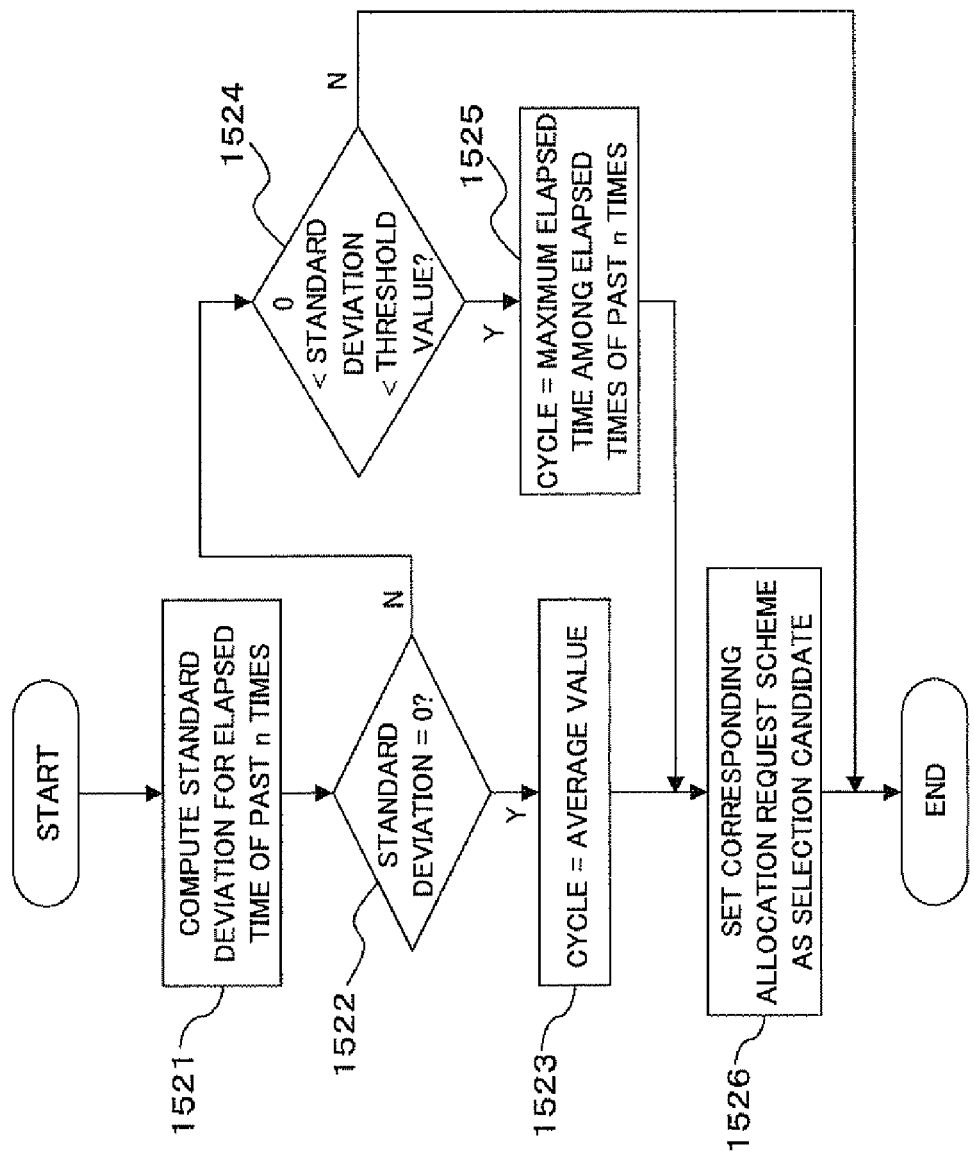
FIG. 8 is a flowchart illustrating another example of a periodicity checking process depicted in FIG. 6.

In a case of an example illustrated in FIG. 8, the cycle determining unit 422 measures an interval (elapsed time) of an allocation request opportunity of past n times and computes a standard deviation (processes 1521) and checks whether a corresponding standard deviation is 0 or not, that is, whether intervals of past n times are same or not (process 1522). In this instance, a value of "n" can be set in the MS 30 in advance or can be adaptively varied.

If the obtained standard deviation is zero (0), the cycle determining unit 422 regards the cycle as an average value of the detecting cycle (processes 1523 from Y route of process 1522), whereas if the standard deviation is not zero (0), the cycle determining unit 422 checks whether the obtained standard deviation is greater than zero and less than a predetermined threshold value or not (process 1524 from N route of process 1522). The threshold value can be set in the MS 30 in advance.

As a result, if the obtained standard deviation is greater than zero and less than a predetermined threshold value, the cycle determining unit 422 regards the maximum interval among intervals of past n times as the detecting cycle (process 1525 from Y route of process 1524).

The cycle determining unit 422 extracts (sets) the allocation request scheme of the cycle with the cycle of the average value or maximum interval as the selection candidate (process 1526). If the standard deviation is equal to or more than the threshold value, the cycle determining unit 422 does not extract the corresponding allocation request scheme as the selection candidate and finishes the process (N route of process 1524).

That is, the cycle determining unit 422 functions as an example of a periodicity detecting unit for detecting a change (fluctuation) of a cycle of each of the allocation request schemes based on allocation intervals of a plurality of past transmission opportunities and as a timing compensating unit for compensating the next (UL burst) allocation frame (timing) estimated in the next allocation estimating unit 423 based on a change of a cycle by correcting the detecting cycle used for estimation in the next allocation estimating unit 423 as described above.

As described above, by checking a periodicity and compensating a timing, it is possible to follow a change of the actual radio propagation environment, so that a precision of a timing estimation can be more improved. Periodicity check and timing compensation are not essential processes and may be omitted when a change of the radio propagation environment is small and affection of a periodicity is negligible.

Meanwhile, after checking a periodicity, the MS 30 determines through the next allocation estimating unit 423 whether an UL burst (UL burst of the larger size than the BR message) for transmitting UL data is allocated based on the content of the UL-MAP analyzed in the UL-MAP analyzing unit 39 or not and whether transmission of the BR message is completed beforehand (i.e., allocation standby state of an UL burst in the BS 10), as illustrated in FIG. 6 (process 1006).

If these conditions are satisfied, the next allocation estimating unit 423 computes an elapsed time until an UL burst is allocated from after the BR message is transmitted and stores it as a measured value of a turnaround time (process 1007 from Y route of process 1006). The measured value is referred to when an UL burst allocation frame is estimated later.

Subsequently, the next allocation estimating unit 423 determines whether a CDMA Allocation IE (UL burst of UIUC=14) for transmitting the BR message is allocated from the BS 10 or not and whether the CDMA BR code is completely transmitted beforehand (i.e., allocation standby state of an UL burst in the BS 10) based on the content of the UL-MAP (process 1008).

If this condition is satisfied, the next allocation estimating unit 423 computes an elapsed time until a CDMA Allocation IE is allocated from after a CDMA BR code is transmitted and stores it as a measured value of a turnaround time (process 1009 from Y route of process 1008). The measured value is referred to when an UL burst allocation frame is estimated later.

If the determining condition in the determining process 1006 or the determining process 1008 is not satisfied, the next allocation estimating unit 423 finishes the process for a corresponding receiving frame without executing the elapsed time computing process 1007 or 1009 (N routes of process 1006 and process 1008).

Next, an operation of the MS 30 that UL data is generated and an allocation request is executed is described with reference to flowcharts of FIGS. 9 and 10.

Figure 9:
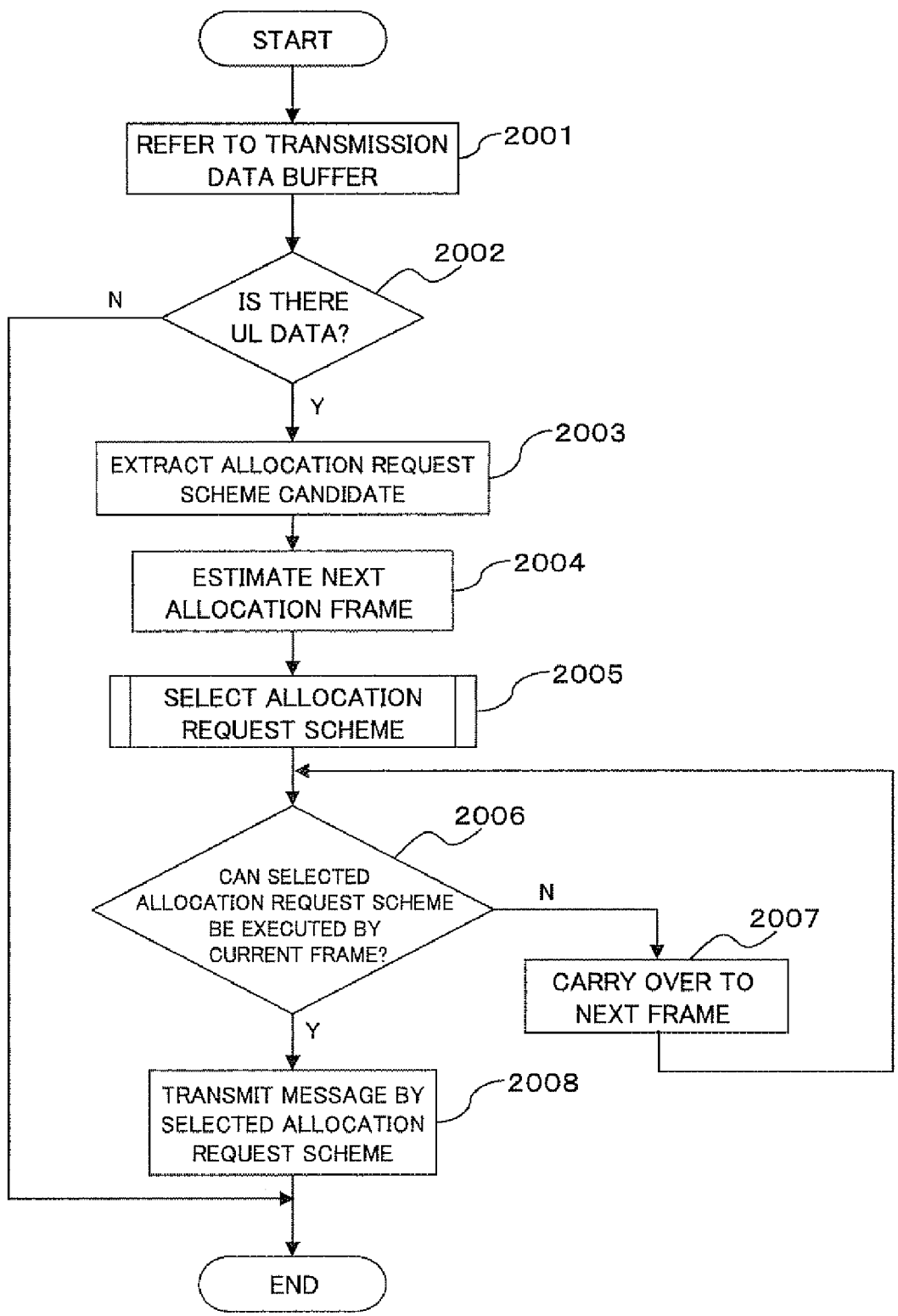
FIG. 9 is a flowchart illustrating an operation (executing an allocation request from after generation of UL data) of the MS depicted in FIG. 5.
Figure 10:
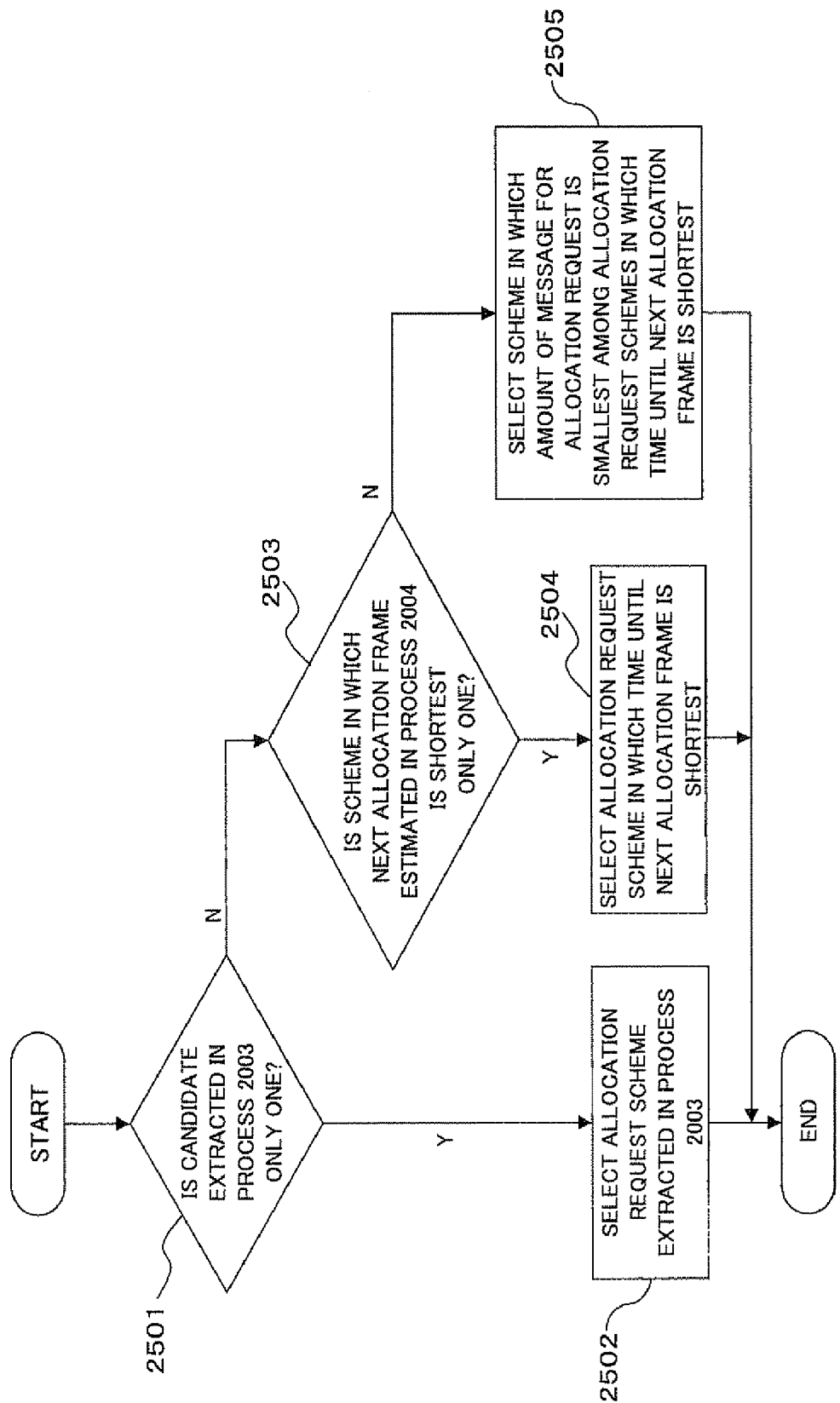
FIG. 10 is a flowchart illustrating an example of an allocation request scheme selecting process depicted in FIG. 9.

As illustrated in FIG. 9, in the MS 30, the UL allocation managing unit 42 refers to the transmission data buffer 32 (process 2001) to check whether UL data is being generated (maintained) or not (process 2002).

If the UL data is being generated, the UL allocation managing unit 42 (the next allocation estimating unit 423) extracts a candidate of the allocation request scheme detected by the allocation request scheme detecting unit 421 and the cycle determining unit 422 (process 2003).

The next allocation estimating unit 423 estimates the next UL burst allocation frame when the allocation request is made to the BS 10 by using each of the extracted candidates (process 2004).

Subsequently, the UL allocation managing unit 42 performs the selection process for the allocation request scheme by the allocation request scheme selecting unit 424 (process 2005). For example, as illustrated in FIG. 10, the allocation request scheme selecting unit 424 checks whether the candidate of the allocation request scheme extracted in the extracting process 2003 is only one or not (process 2501) and selects the candidate if the extracted candidate is only one (process 2502).

Meanwhile, if the candidate of the allocation request scheme extracted in the extracting process 2003 is plural, the allocation request scheme selecting unit 424 determines whether the candidate of the allocation request scheme in which the next UL burst allocation frame estimated in the estimating process 2004 is earlier than others is only one or not for each candidate (process 2503 from N route of process 2501).

As the determining result, if the candidate is only one, the allocation request scheme selecting unit 424 selects the candidate as the allocation request scheme to be executed (process 2504 from Y route of process 2503). Meanwhile, as the result of the determining process 2503, if the candidate of the allocation request scheme estimated as the next UL burst allocation frame earlier than others is plural, the allocation request scheme selecting unit 424 selects a candidate whose amount of a message when the allocation request is made is small (process 2505 from N route of process 2503).

Figure 2:
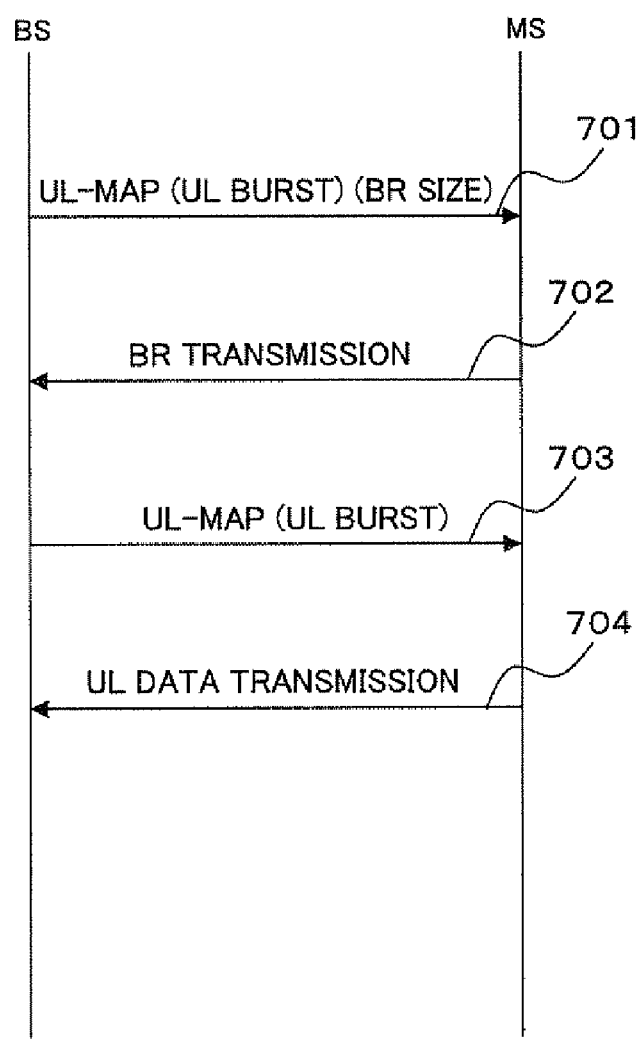
FIG. 2 is a view illustrating an allocation request sequence of an UL burst by using polling.
Figure 3:
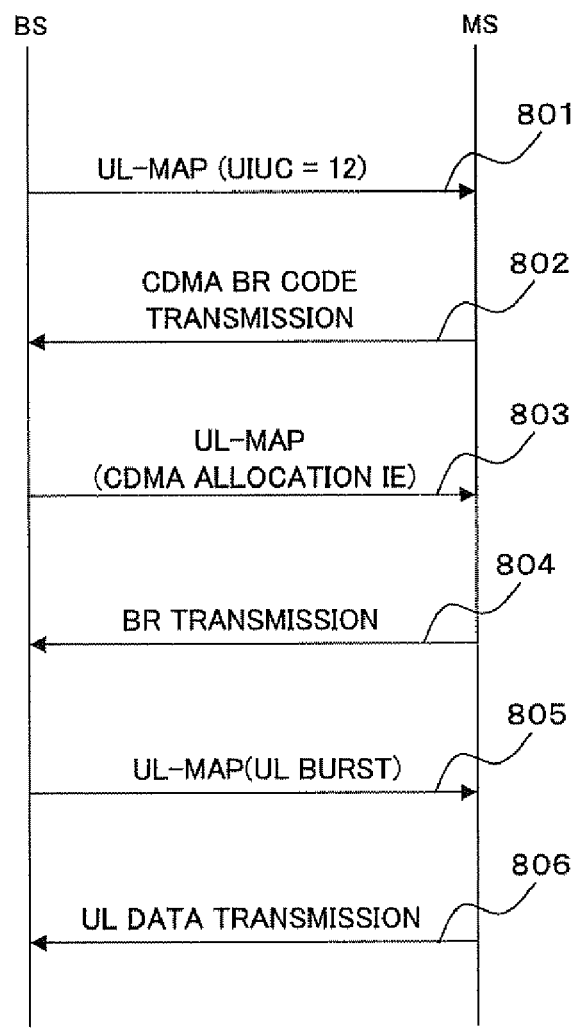
FIG. 3 is a view illustrating an allocation request sequence of an UL burst by using contention.
Figure 4:
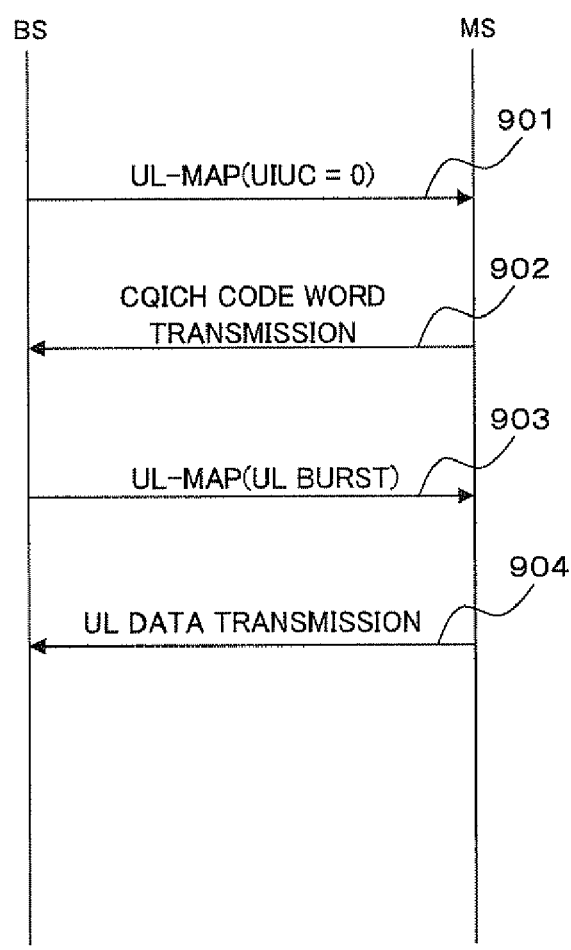
FIG. 4 is a view illustrating an allocation request sequence of an UL burst by using CQICH.

Here, a magnitude relationship of the allocation request schemes (sequences) for the amount of a message transmitted or received between the BS 10 and the MS 30 is, for example, CQICH<polling<contention as illustrated in FIGS. 2 to 4. Therefore, in this instance, for example, if CQICH is included among candidates of the allocation request scheme estimated as the next UL burst allocation earlier than others, the CQICH is selected as the allocation request scheme to be executed.

If the allocation request schemes whose amount of a message necessary for execution of the allocation request is same exist, it does not matter which of the allocation request schemes is selected. The allocation request scheme can be selected randomly or by a certain condition or rule (e.g., a different scheme from the previous time is preferentially selected).

Meanwhile, when the allocation request scheme is selected as described above, the MS 30 (allocation request scheme selecting unit 424) checks whether the selected allocation request scheme is executable in the current frame or not based on the content of the UL-MAP as illustrated in FIG. 9 (process 2006), and standbys the execution until the next executable frame if not executable in the current frame (process 2007 from N route of process 2006).

Meanwhile, if the selected allocation request scheme is executable in the current frame, the allocation request scheme selecting unit 424 requests the control message generating unit 43 to transmit the BR message (in a case of polling), the CDMABR code (in a case of contention) or the codeword (in the case of CQICH) to the BS 10 based on the selected allocation request scheme (process 2008 from Y route of process 2006).

Figure 11:
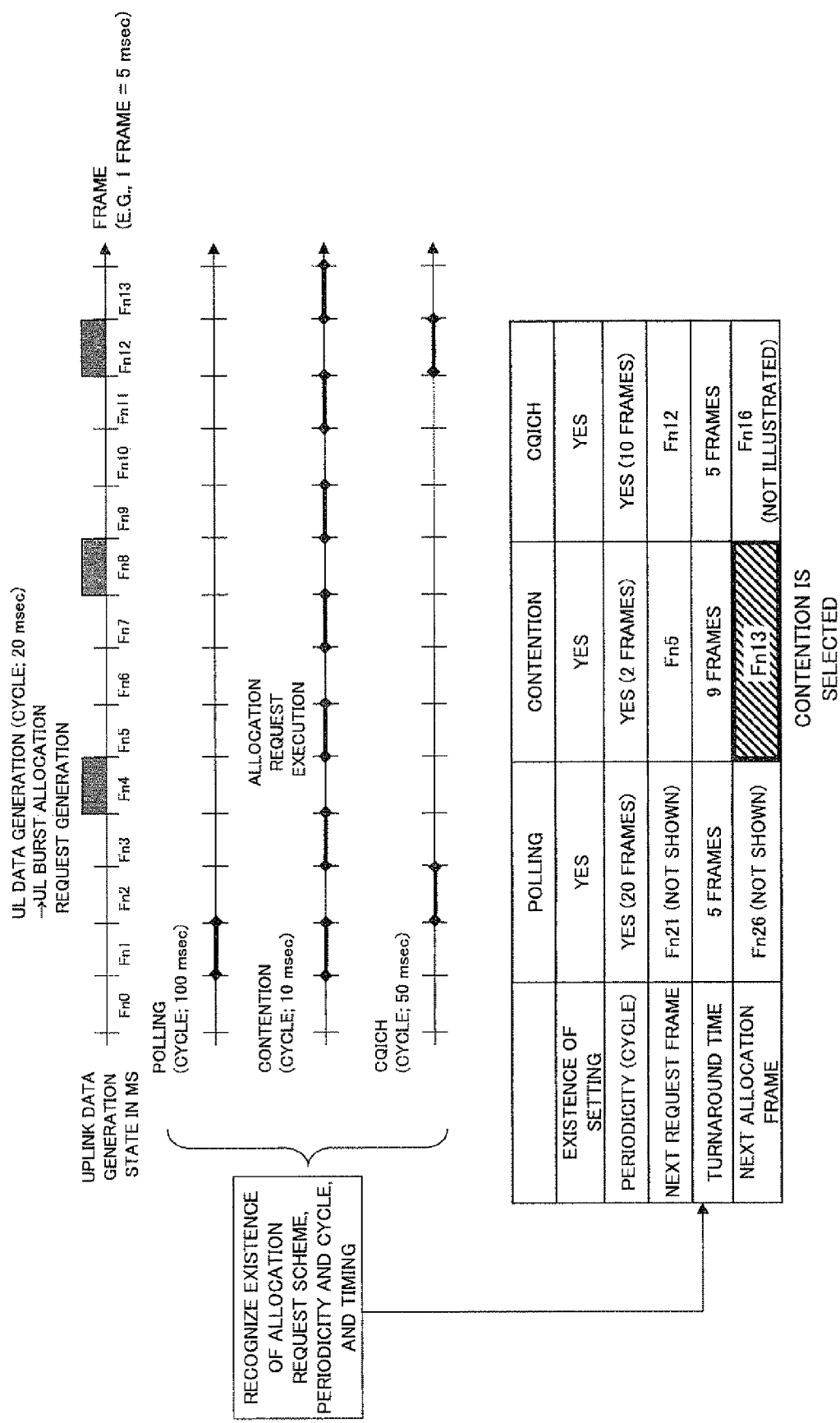
FIG. 11 is a view illustrating one example for selecting an allocation request scheme in the MS depicted in FIG. 5.
Figure 12:
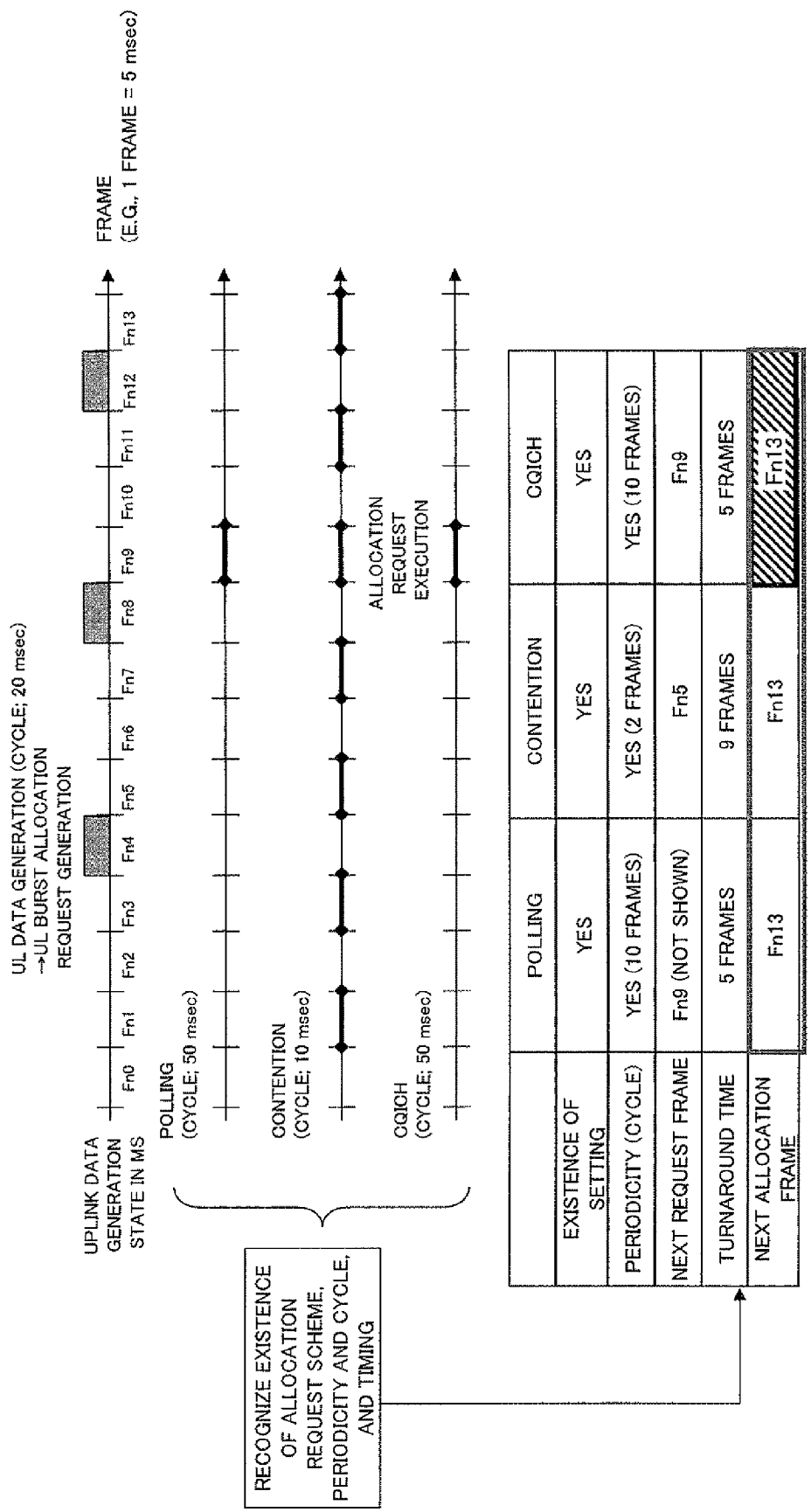
FIG. 12 is a view illustrating another example for selecting an allocation request scheme in the MS depicted in FIG. 5.

FIG. 11 illustrates a case where the allocation request scheme selected by the allocation request scheme selecting unit 424 is contention, and FIG. 12 illustrates a case where the allocation request scheme selected by the allocation request scheme selecting unit 424 is CQICH.

In FIG. 11, a cycle of polling is 100 ms (20 frames), a cycle of contention is 10 ms (2 frames), and a cycle of CQICH is 50 ms (10 frames). UL data is generated in the MS 30 at a cycle of 20 ms from a frame Fn4 (i.e., in frames Fn4, Fn8, and Fn12).

In this instance, after a frame Fn4 in which UL data is generated in the MS 30, it is estimated that a frame in which the next polling is performed from the BS 10 is Fn21 (not illustrated) and a frame in which the BS 10 allocates an UL burst in response to the BR message transmitted from the MS 30 is Fn26 (not illustrated).

Also, after a frame Fn4 in which UL data is generated in the MS 30, it is estimated that a frame in which CQICH is set as next is Fn12 and a frame in which the BS 10 allocates an UL burst in response to the codeword transmitted from the MS 30 is Fn16 (not illustrated). Meanwhile, it is estimated that contention area is set in a frame Fn5 and a frame in which the BS 10 allocates an UL burst in response to the CDMABR code and the BR message transmitted from the MS 30 is Fn13.

Therefore, the MS 30 (allocation request scheme selecting unit 424) selects the allocation request scheme for executing contention in which an allocation of an UL burst can be earliest resumed (in a frame Fn13), as one example of the selection criterion, and transmits an allocation request of an UL burst to the BS 10 by using contention area set in a frame Fn5 in which a corresponding allocation request scheme is executable after generation of UL data (a frame Fn4).

At this time, the MS 30 may not transmit the allocation request in the transmission opportunity (in FIG. 11, for example, transmission opportunity of a frame Fn1 in polling or transmission opportunity of a frame Fn2 in CQICH) of other allocation request schemes which come before a frame Fn5.

That is, this is a case where the transmission opportunity of polling or CQICH as an example of one allocation request scheme comes before the transmission opportunity of contention as an example of another allocation request scheme, and if an estimated timing (a frame Fn26 or Fn16 in FIG. 11) to which a radio resource is allocated in a case of using the transmission opportunity of the former allocation request scheme (polling or CQICH) is after an estimated timing (a frame Fn13 in FIG. 11) to which a radio resource is allocated in a case of using the transmission opportunity of the latter allocation request scheme, the MS 30 may not transmit the allocation request to the BS 10 in the allocation transmission opportunity of polling or CQICH and may transmit the allocation request to the BS 10 in the allocation transmission opportunity of the latter contention. Of course, there is a case where contention is the former allocation request scheme and either polling or CQICH is the latter allocation request scheme.

Meanwhile, in FIG. 12, a cycle of polling and CQICH is 50 ms (10 frames), and a cycle of contention is 10 ms (2 frames). UL data is being generated in the MS 30 at a cycle of 20 ms from a frame Fn4 (i.e., in frames Fn4, Fn8 and Fn12). In this instance, after a frame Fn4 in which UL data is generated in the MS 30, it is estimated that a frame in which the next polling is performed from the BS 10 is Fn9, a frame in which the next contention area is set is Fn5, and a frame in which the next CQICH is set is Fn9.

Therefore, if a turnaround time of each of the allocation request schemes is considered, a frame of an UL burst in which the BS 10 performs the next allocation is same as a frame Fn13 in all of polling, contention and CQICH. In this instance, the MS 30 may select the allocation request scheme in which the amount of a message necessary for the allocation request of an UL burst is smallest, in order to save a radio resource as much as possible, as an example of the selection criterion.

If the magnitude relationship for the transceiving amount of a message required in each of the allocation request schemes is CQICH<polling<contention as described above, the MS 30 (allocation request scheme selecting unit 424) selects the CQICH which is smallest in message amount, and transmits the allocation request to the BS 10 by using the CQICH set in a frame Fn9.

As described hereinbefore, according to the UL communication control method of the embodiment, since it is possible to efficiently use a radio resource while reducing a turnaround time when an allocation of an UL burst is resumed, for example, it is possible to avoid a vase in which the MS 30 executes the allocation request by simply using the allocation request scheme the timing of which is earliest from after UL data is generated, even though a beginning frame of the allocation request sequence of an UL burst is the foremost, a staying time of UL data in the MS 30 consequently becomes lengthy due to a difference of a turnaround time until an UL burst is allocated, and a transmission delay of UL data or an overflow of the transmission data buffer 32 are generated.

Figure 13:
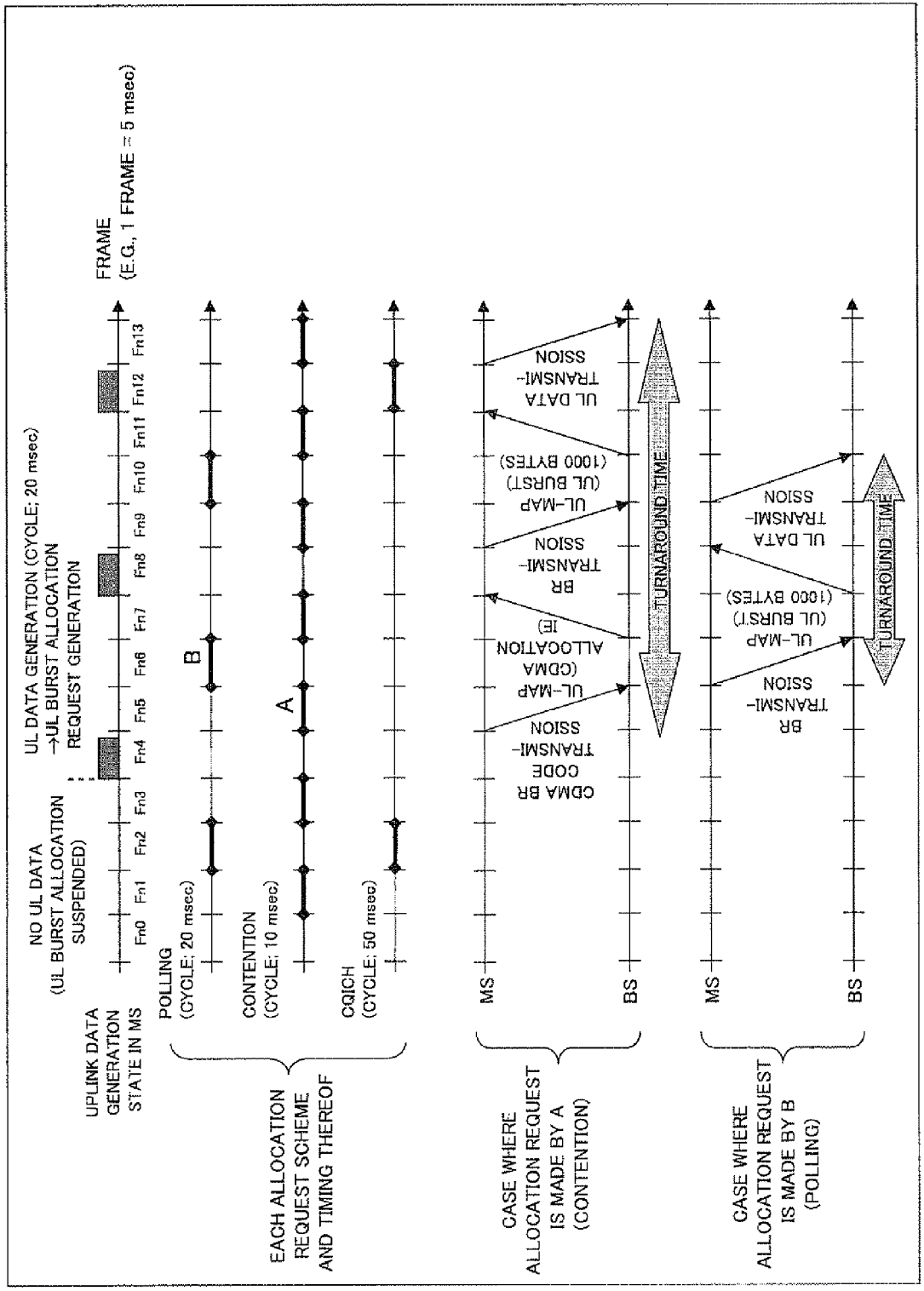
FIG. 13 is a view illustrating an effect resulting from the MS depicted in FIG. 5.

Also, for reference, FIG. 13 illustrates an exemplary operation of the MS when the allocation request is executed by simply using the allocation request scheme the timing of which is earliest from after UL data is generated. In FIG. 13, a transverse axis denotes a time direction using a radio frame as a unit, and frames Fn0 to Fn13 are sequentially indicated under the assumption that one frame (including both a DL and an UL) is 5 ms (milliseconds).

In the MS, during a period of a frame Fn0 to a frame Fn3, UL data is not generated, and an allocation of an UL burst from the BS is suspended. In a frame Fn4, when UL data is generated in the MS, the MS requests the BS to resume an allocation of an UL burst in a frame after a frame Fn4.

Here, the BS performs polling at an interval of 20 ms (4 frames) for the MS, and the timings are Fn2, Fn6, Fn10, . . . . Also, the BS sets contention area on the UL sub-frame at an interval of 10 ms (2 frames), and the timings are Fn1, Fn3, Fn5, Fn7, Fn9, Fn11, Fn13, . . . . Also, CQICH is established between the BS and the MS, the cycle is 50 ms (10 frames), and the timings are Fn2, Fn12, . . . .

The MS enters an execution standby state of the allocation request for an allocation resumption of an UL burst in a frame Fn4 in which UL data is generated. The MS recognizes that contention area is set in a frame Fn5 by the UL-MAP of the radio frame received before a frame Fn5 and begins the allocation request in a frame Fn5 by contention (See a sign A in FIG. 13).

In this instance, the sequence of FIG. 3 is executed from a frame Fn5 between the MS and the BS, and the MS can finally transmit UL data to the BS in a frame Fn13.

However, as indicated by a sign B, the MS would be able to finally transmit UL data to the BS in a frame Fn10 by executing the sequence of FIG. 2 even in a frame Fn6 if it is able to use the transmission opportunity of the BR message allocated by polling in a frame Fn6.

According to the UL communication control method of the embodiment, it is possible to prevent an allocation delay of an UR burst and a delay of a timing at when the UL data can be transmitted.

In the embodiment, it is assumed that there are three types of allocation request schemes, or polling, contention, and CQICH; however, even in a case where there are two or four types of allocation request schemes, the MS 30 may likewise select and perform an appropriate allocation request scheme based on a difference in periodicity, and a difference in turnaround time of allocation request sequences.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A wireless communication control method in a wireless communication system including a radio terminal and a base station for allocating an uplink radio resource to the radio terminal, the method comprising:
at the radio terminal,
in a transmission opportunity of each of plural kinds of allocation request schemes for a first uplink radio resource, the transmission opportunity being periodically allocated from the base station, estimating timings that the first uplink radio resource is allocated from the base station when an allocation request of a corresponding allocation request scheme is transmitted, based on a cycle of the transmission opportunity and a turnaround time of the allocation request scheme;
selecting an allocation request scheme corresponding to a timing satisfying a predetermined selection criterion among the estimated timings; and
transmitting the allocation request to the base station by a selected allocation request scheme in a transmission opportunity corresponding to the selected allocation request scheme.

2. The method according to claim 1, wherein the timing satisfying the selection criterion is the earliest timing among the estimated timings.

3. The method according to claim 1, wherein the transmission opportunity includes at least two among a first transmission opportunity, corresponding to a first allocation request scheme, which is periodically allocated a second uplink radio resource for the allocation request from the base station without a request to the base station, a second transmission opportunity, corresponding to a second allocation request scheme, which is allocated a third uplink radio resource for requesting the base station to allocate a second uplink radio resource used for the allocation request from the base station, and a third transmission opportunity, corresponding to a third allocation request scheme, which is allocated a fourth uplink radio resource for reporting information about reception quality to the base station.

4. The method according to claim 3, wherein the radio terminal obtains the turnaround time for each of the allocation request schemes by measuring a time until the first uplink radio resource is allocated after the allocation request is made by each of the allocation request schemes in the past.

5. The method according to claim 4, wherein the radio terminal obtains the turnaround time for the first allocation request scheme by measuring a time until the first uplink radio resource is allocated after the allocation request is made by the first allocation request schemes in the past.

6. The method according to claim 4, wherein the radio terminal obtains the turnaround time for the second allocation request scheme by measuring a time until the first uplink radio resource is allocated from the base station in response to a corresponding allocation request after allocation of the second uplink radio resource is requested to the base station by using the third uplink radio resource by the second allocation request scheme in the past, and the allocation request is then made by using the second uplink radio resource allocated by the base station.

7. The method according to claim 4, wherein the radio terminal obtains the turnaround time for the third allocation request scheme by measuring a time until the first uplink radio resource is allocated after the allocation request is made by using the fourth uplink radio resource by the third allocation request schemes in the past.

8. The method according to claim 1, wherein the radio terminal selects an allocation request scheme in which the amount of a message transmitted to or received from the base station is small when there is a plurality of allocation request schemes corresponding to a timing satisfying the selection criterion.

9. The method according to claim 1, wherein the radio terminal detects a change of the cycle of each of the allocation request schemes based on a plurality of past transmission opportunity allocation intervals and compensates the estimated timing based on the detected change.

10. A radio terminal in a wireless communication system which includes the radio terminal and a base station for allocating an uplink radio resource to the radio terminal, the radio terminal comprising:
an estimating unit that estimates, in a transmission opportunity of each of plural kinds of allocation request schemes for a first uplink radio resource, the transmission opportunity being periodically allocated from the base station, timings that the first uplink radio resource is allocated from the base station when an allocation request of a corresponding allocation request scheme is transmitted, based on a cycle of the transmission opportunity and a turnaround time of the allocation request scheme; and an allocation request transmission unit that transmits the allocation request to the base station in a transmission opportunity selected by the estimated timing.

11. The radio terminal according to claim 10, wherein a transmission opportunity selected by the estimated timing is a transmission opportunity of an allocation request scheme corresponding to the earliest timing among the estimated timings.

12. The radio terminal according to claim 10, wherein the estimating unit includes a detecting unit which detects whether or not the transmission opportunity includes two or more of a first transmission opportunity, corresponding to a first allocation request scheme, which is periodically allocated a second uplink radio resource for the allocation request from the base station without a request to the base station, a second transmission opportunity, corresponding to a second allocation request scheme, which is allocated a third uplink radio resource for requesting the base station to allocate a second uplink radio resource used for the allocation request from the base station, and a third transmission opportunity, corresponding to a third allocation request scheme, which is allocated a fourth uplink radio resource for reporting information about reception quality to the base station.

13. The radio terminal according to claim 12, wherein the estimating unit obtains the turnaround time of each of the allocation request scheme by measuring a time until the first uplink radio resource is allocated after the allocation request is made by each of the allocation request schemes in the past.

14. The radio terminal according to claim 13, wherein the estimating unit includes a first turnaround measuring unit which obtains the turnaround time for the first allocation request scheme by measuring a time until the first uplink radio resource is allocated after the allocation request is made by using the second uplink radio resource by the first allocation request schemes in the past.

15. The radio terminal according to claim 13, wherein the estimating unit includes a second turnaround time measuring unit which obtains the turnaround time for the second allocation request scheme a time until the first uplink radio resource is allocated from the base station in response to a corresponding allocation request after allocation of the second uplink radio resource is requested to the base station by using the third uplink radio resource by the second allocation request scheme in the past, and the allocation request is then made by using the second uplink radio resource allocated by the base station.

16. The radio terminal according to claim 13, wherein the estimating unit includes a third turnaround time measuring unit which obtains the turnaround time for the third allocation request scheme by measuring a time until the first uplink radio resource is allocated after the allocation request is made by using the fourth uplink radio resource by the third allocation request schemes in the past.

17. The radio terminal according to claim 10, wherein the allocation request transmission unit selects an allocation request scheme in which the amount of a message transmitted to or received from the base station is small when there is a plurality of allocation request schemes corresponding to a timing satisfying the selection criterion.

18. The radio terminal according to claim 10, wherein the estimating unit includes a periodicity detecting unit which detects a change of the cycle of each of the allocation request schemes based on a plurality of past transmission opportunity allocation intervals and a timing compensating unit which compensates the estimated timing based on the detected change.

19. A wireless communication control method in a wireless communication system including a radio terminal and a base station for allocating an uplink radio resource to the radio terminal, the method comprising:

at the radio terminal,
when a transmission opportunity of a first allocation request scheme comes before a transmission opportunity of a second allocation request scheme, if an estimated timing at which a radio resource is allocated by using the transmission opportunity of the first allocation request scheme is after an estimated timing at which a radio resource is allocated by using the transmission opportunity of the second allocation request scheme, transmitting an allocation request in the transmission opportunity of the second allocation request scheme to the base station without transmitting an allocation request in the transmission opportunity of the first allocation request scheme.

* * * * *